United States Patent
Goldschmidt Iki et al.

(10) Patent No.: US 8,656,427 B2
(45) Date of Patent: Feb. 18, 2014

(54) METHOD AND APPARATUS FOR PROVIDING PERSONALIZED SUPPLEMENTAL PROGRAMMING

(75) Inventors: Jean M. Goldschmidt Iki, San Jose, CA (US); Anthony A. Shah-Nazaroff, Santa Clara, CA (US); David N. Hackson, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/553,722

(22) Filed: Jul. 19, 2012

(65) Prior Publication Data

US 2012/0291069 A1  Nov. 15, 2012

Related U.S. Application Data

(62) Division of application No. 10/324,691, filed on Dec. 19, 2002, now Pat. No. 8,250,602, which is a division of application No. 10/325,818, filed on Dec. 19, 2002, now Pat. No. 7,370,026, which is a division of application No. 08/916,865, filed on Aug. 22, 1997, now Pat. No. 6,601,103.

(60) Provisional application No. 60/024,438, filed on Aug. 22, 1996.

(51) Int. Cl.
*H04N 5/445* (2011.01)
(52) U.S. Cl.
USPC ............................................................ 725/40
(58) Field of Classification Search
USPC ........................................ 709/231; 725/40
See application file for complete search history.

(56) References Cited

U.S. PATENT DOCUMENTS

| 4,706,121 | A |   | 11/1987 | Young |
| 4,977,455 | A |   | 12/1990 | Young |
| 5,534,911 | A |   | 7/1996 | Levitan |
| 5,550,576 | A |   | 8/1996 | Klosterman |
| 5,561,457 | A |   | 10/1996 | Cragun et al. |
| 5,589,892 | A | * | 12/1996 | Knee et al. ........................ 725/43 |
| 5,657,072 | A | * | 8/1997 | Aristides et al. ................ 725/46 |
| 5,666,645 | A | * | 9/1997 | Thomas et al. .................. 725/47 |
| 5,671,225 | A | * | 9/1997 | Hooper et al. ................. 370/468 |
| 5,671,411 | A |   | 9/1997 | Watts et al. |
| 5,734,720 | A | * | 3/1998 | Salganicoff .................... 380/211 |

(Continued)

FOREIGN PATENT DOCUMENTS

| EP | 99 956812.4 | 6/2004 |
| WO | WO 97/02521 | 1/1997 |
| WO | WO 98/43406 | 10/1998 |

OTHER PUBLICATIONS

U.S. Appl. No. 08/338,429, entitled A Method and Apparatus for Controlling Video/Audio and Channel Selection in a Communication Signal Based on the Textual PCT/US92/09087, May 1993.

*Primary Examiner* — Douglas Blair
(74) *Attorney, Agent, or Firm* — Christopher K. Gagne (57) ABSTRACT

A method and apparatus for providing personalized supplemental programming is provided. In one embodiment, the invention can include searching text for a keyword, the text associated with primary programming to be provided to an element of an entertainment system, accessing a database upon finding the keyword, retrieving content associated with the keyword from the database, combining the retrieved content with the primary programming to generate combined programming, and providing the combined programming to the element of the entertainment system.

24 Claims, 8 Drawing Sheets

(56) References Cited

U.S. PATENT DOCUMENTS

| | | | |
|---|---|---|---|
| 5,758,257 A * | 5/1998 | Herz et al. | 725/116 |
| 5,790,172 A | 8/1998 | Imanaka | |
| 5,790,935 A * | 8/1998 | Payton | 725/91 |
| 5,859,662 A | 1/1999 | Cragun et al. | |
| 5,861,881 A | 1/1999 | Freeman | |
| 5,867,205 A | 2/1999 | Harrison | |
| 5,878,222 A | 3/1999 | Harrison | |
| 5,935,004 A * | 8/1999 | Tarr et al. | 463/40 |
| 6,002,393 A | 12/1999 | Hite et al. | |
| 6,003,041 A | 12/1999 | Wugofski | |
| 6,005,602 A | 12/1999 | Matthews, III | |
| 6,025,837 A * | 2/2000 | Matthews et al. | 715/721 |
| 6,147,714 A * | 11/2000 | Terasawa et al. | 348/564 |
| 6,240,555 B1 | 5/2001 | Shoff et al. | |
| 6,324,694 B1 | 11/2001 | Watts et al. | |
| 6,601,103 B1 * | 7/2003 | Goldschmidt Iki et al. | 709/231 |
| 7,370,026 B2 * | 5/2008 | Goldschmidt Iki et al. | 707/706 |
| 7,624,337 B2 * | 11/2009 | Sull et al. | 715/201 |
| 2002/0083123 A1 | 6/2002 | Freedman et al. | |
| 2003/0088613 A1 * | 5/2003 | Goldschmidt Iki et al. | 709/202 |
| 2004/0139465 A1 * | 7/2004 | Matthews et al. | 725/51 |
| 2005/0210145 A1 * | 9/2005 | Kim et al. | 709/231 |
| 2006/0064716 A1 * | 3/2006 | Sull et al. | 725/37 |

* cited by examiner

| Genre | Default Content Criteria | User Specified Content Criteria | | | Supplemental Programming | | | |
|---|---|---|---|---|---|---|---|---|
| | | Text | Video | Audio | Text | Video | Audio | Pers. |
| S P O R T S | Touchdown | Michigan Touchdown | | "Michigan Touchdown" | | | Michigan Fight Song | Exc.wav |
| | Homerun | — | — | — | Homerun | — | — | — |
| | Goal | — | Jordon Video | — | — | — | Goal.wav | — |
| | 3-Point Shot | — | Ted Koppel | — | — | — | Iwannabe.wav | — |
| | — | — | Dan Rather | — | — | — | Hiar.wav | Beavis.wav |
| | — | — | OJ Simpson | OJ Simpson | — | — | — | Wayne.wav |
| | — | OJ Simpson | — | — | — | — | Ugh.wav | Homer.wav |
| N E W S | Forecast of Rain | — | — | — | — | Storm.vdo | — | — |
| F I N A N C I A L | DOW - Up | — | — | — | — | — | Yeah.wav | Beavis.wav |
| | DOW - Down | — | — | INTEL Down | — | Shack.vdo | Ouch.wav | Kramer.wav |
| | — | INTEL " - " | — | INTEL Up | — | Yacht.vdo | Ouch.wav | — |
| | — | INTEL " + " | — | — | — | — | Yeah.wav | — |
| | — | Personal Portfolio UP | — | — | — | — | Cash register.wav | — |

METHOD AND APPARATUS FOR PROVIDING PERSONALIZED SUPPLEMENTAL PROGRAMMING

RELATED APPLICATIONS

The present application is a division of U.S. patent application Ser. No. 10/324,691, filed Dec. 19, 2002 now U.S. Pat. No. 8,250,602, entitled "Method and Apparatus for Providing Personalized Supplemental Programming", now allowed, which is a division of U.S. patent application Ser. No. 10/325,818, filed Dec. 19, 2002, entitled "Method and Apparatus for Providing Personalized Supplemental Programming" issued as U.S. Pat. No. 7,370,026 on May 6, 2008, which is a division of U.S. patent application Ser. No. 08/916,865 entitled "Method and Apparatus for Automatically Providing Personalized Supplemental Programming", filed Aug. 22, 1997, issued as U.S. Pat. No. 6,601,103, on Jul. 29, 2003, which claims priority to provisional application Ser. No. 60/024,438 entitled "Commentary Based on Content and Keywords," filed Aug. 22, 1996. The priorities of each of these applications is hereby claimed.

BACKGROUND OF THE INVENTION

1. Field of the Invention

The present invention relates to the field of entertainment systems and, in particular, to a method and apparatus for providing personalized supplemental programming in entertainment systems.

2. Background Information

Numerous advances have been made in recent years in the field of entertainment systems. Many providers of programming content now offer supplemental programming content designed to complement the normal/typical program information. For example, many television networks provide supplemental closed captioning of the audio information to allow people who are hearing impaired to view and enjoy the network's programming. The closed caption information is typically provided within line 21 of the vertical blanking interval (VBI) of the television signal. Another example of supplemental programming is the Supplemental Audio Programming (SAP) that is provided by many television networks, wherein the audio content of a broadcast is provided in an alternate language, or other supplemental audio content directed to the broadcast is provided. Many entertainment systems allow the system user to enable or disable such supplemental broadcast services.

Other examples of supplemental programming exist throughout, for example, the Internet. Many of the web sites throughout the Internet, for example, provide supplemental programming information. Such information may be introduced by any of the intermediate routers between the user and the host web site. In particular, many of the Internet Service Providers (ISP's) sell advertising space to local businesses, wherein the advertising will be displayed to all users browsing a particular web site, or web site genre. However, the web sites that provide such supplemental programming information often rely on the uniform resource locator (URL) of the accessed web site to determine which web site is being browsed and, consequently, which supplemental information to provide. In other words, the ISP's do not evaluate the content of the information flow between the web site and the browser to determine what supplemental programming information to provide. In addition, this supplemental information is not personalized. Rather, it is common to a particular genre of web sites and provided to each user of the ISP accessing a particular genre of web sites. For example, those users viewing an automotive web site are likely to receive supplemental information regarding automotive products or services offered via the web, however the same generic supplemental information is provided to all users of the web site.

Insofar as all of the supplemental programming of prior art systems is supplied by the broadcast networks or in the stream of broadcast, and that such information is not truly personalized for the recipient of such information, none of the prior art entertainment systems provide personalized supplemental programming to users of entertainment systems.

Thus, a need exists for a method and apparatus for providing personalized supplemental programming content.

SUMMARY OF THE INVENTION

In accordance with the teachings of the present invention, a method and apparatus for automatically providing personalized supplemental programming is provided. In a first embodiment, an apparatus comprising a first component for supplying supplemental programming, a second component operative to receive primary programming from an external source, and a processor agent coupled to the first and the second components. The processor agent being operative to evaluate the received primary programming for predetermined content criteria, and to provide appropriate ones of the supplemental programming based on the results of the evaluation.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features have been omitted or simplified for ease of explanation. Furthermore, for ease of understanding, certain method steps are delineated as separate steps, however, these separately delineated steps should not be construed as necessarily order dependent in their performance.

Figure 1:
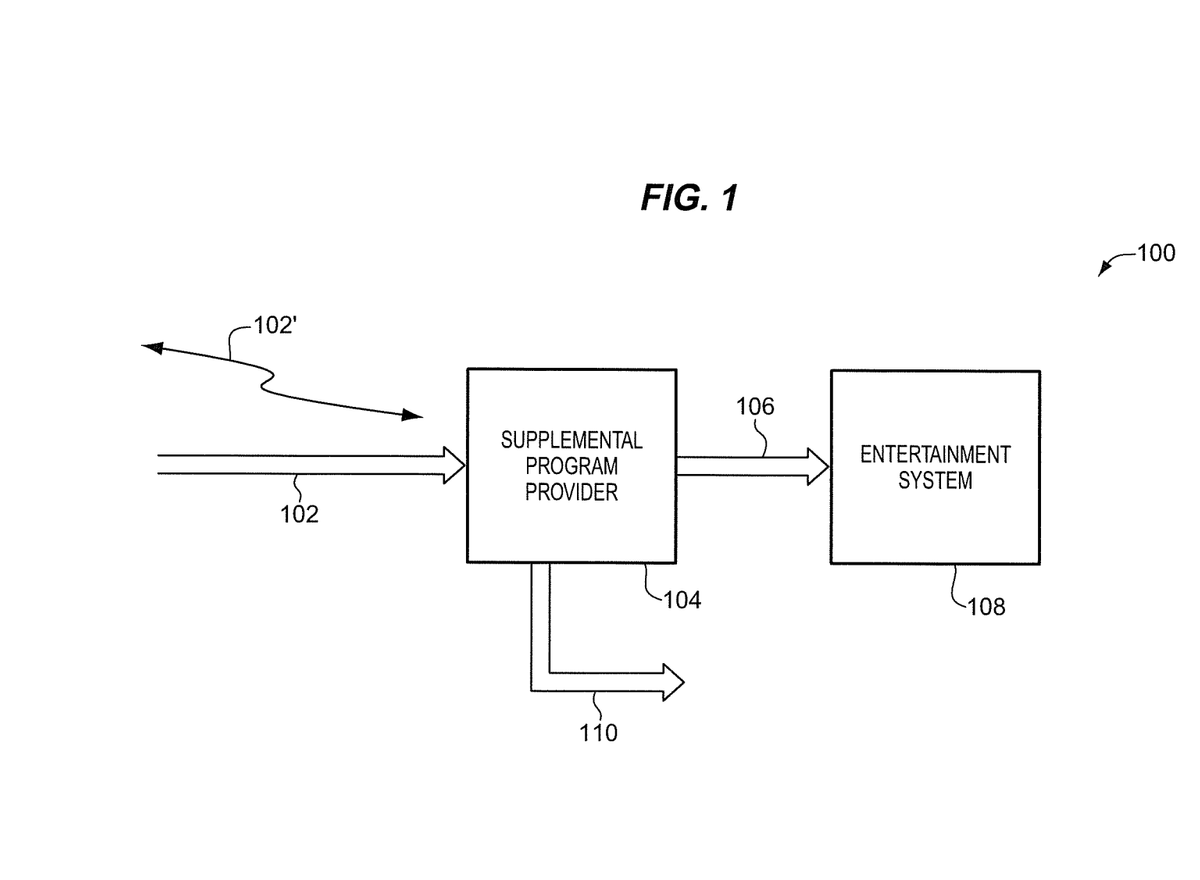
FIG. 1 is a block diagram illustrating a system providing personalized supplemental programming, incorporating the teachings of the present invention.

Turning to FIG. 1, a block diagram illustrating one example of a system incorporating the teachings of the present invention is depicted. In accordance with the illustrated example embodiment, system 100 is depicted comprising supplemental programming provider 104 which receives primary programming (e.g., television programming, internet programming, radio programming, satellite programming, etc.) via a number of alternative mediums. For example, supplemental programming provider 104 receives primary programming from wireline sources (cable television, cable radio, computer network sources, telephone line, etc.) via line 102. Supplemental programming provider 104 can also receive primary programming from wireless sources such as broadcast television, broadcast radio, infrared computer networks, and the like cumulatively depicted with signal 102', via appropriate antennae (not shown).

As will be discussed in greater detail below, supplemental programming provider 104 evaluates primary programming information received from various sources (e.g., cable 102, signal 102', an electronic program guide (EPG), or locally stored primary programming) against individual system user preferences for predetermined content criteria that corresponds with the individual system user preferences and personality, whereupon the supplemental programming provider 104 outputs personalized supplemental programming associated with the predetermined content criteria via line 106 to the individual elements of an entertainment system (e.g., television system, audio system, computer system, etc.), cumulatively identified within system 100 as entertainment system 108. That is to say, supplemental programming provider 104 continuously evaluates primary programming information for content that satisfies the predetermined content criteria found within a user profile for the current user of system 100, and, when the predetermined content criteria of the user profile is satisfied, supplemental programming provider 104 outputs supplemental programming associated with the predetermined content criteria. In addition to the foregoing, supplemental programming provider 104 monitors trends in information obtained from primary programming to provide supplemental programming associated with those trends, and provides a host of external outputs, cumulatively identified by line 110 to control environmental elements such as room lighting, temperature controls (i.e., thermostat), and the like. Thus, as will be described in greater detail below, the supplemental programming may be informative, educational, entertaining, and/or program enhancing.

In one embodiment, supplemental programming provider 104 may be a computer system incorporated with the teachings of the present invention, as will be discussed further with respect to FIG. 7, below. In another embodiment, supplemental programming provider 104 may be a "set-top" box endowed with the necessary processing power and incorporated with the teachings of the present invention. Alternatively, supplemental programming provider 104 may well be incorporated into individual elements within system 100 (e.g., television system, stereo tuner, or computer network).

Figure 2:
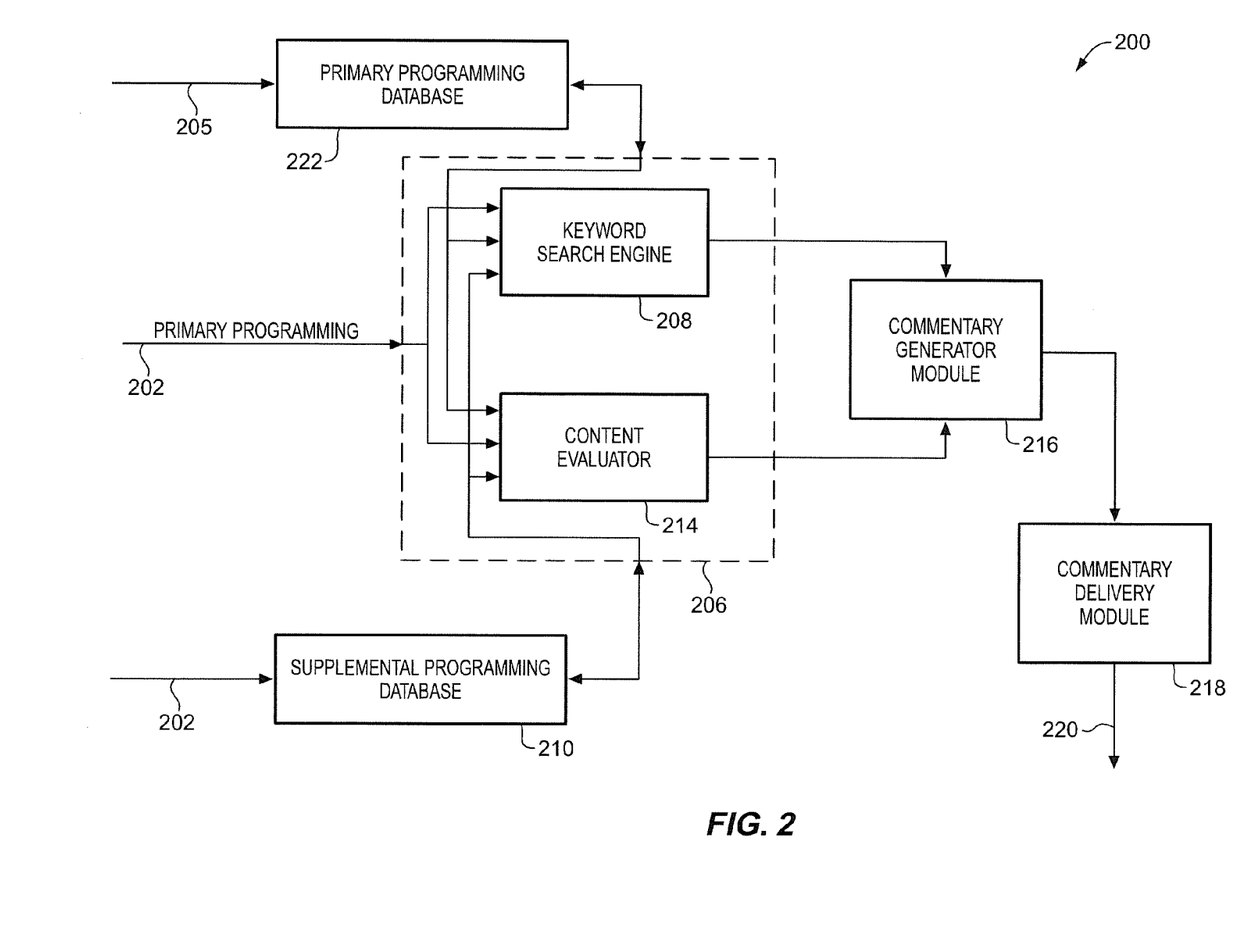
FIG. 2 is a block diagram of a supplemental programming provider for evaluating primary programming content and providing personalized supplemental programming, in accordance with one embodiment of the present invention.

Having introduced the concept of the innovative supplemental programming provider 104 above within the context of system 100, FIG. 2 provides a block diagram which illustrates one example architecture of supplemental programming provider 200 suitable for use in system 100, incorporating the teachings of the present invention. In one embodiment, supplemental programming provider 200 is beneficially integrated into system 100 as supplemental programming provider 104. As illustrated in the functional block diagram of FIG. 2, example supplemental programming provider 200 comprises commentary provider 206 including keyword search engine 208 and content evaluator 214, supplemental programming database 210 (also referred to as a keyword specification module), primary programming database 222 (also referred to as a program description source, or an electronic program guide (EPG)), commentary generator module 216 and commentary delivery module 218, communicatively coupled together as depicted.

In the illustrated embodiment of FIG. 2, supplemental programming provider 200 receives primary programming via line 202 at an input port which directs the primary programming to commentary provider 206. As depicted, the primary programming received via line 202 is intended to represent primary programming received via wireline sources (e.g., line 102 in system 100) and wireless sources (e.g., signal 102' in system 100). In one embodiment, commentary provider 206 receives primary programming via line 202, and provides the primary programming to keyword search engine 210 and content evaluator 214. If the primary programming contains text information, such as the closed caption information found in the VBI of a television signal, or computer data communications, keyword search engine 210 evaluates the received text information for content that satisfies the predetermined content criteria. In addition, the received primary programming is routed to content evaluator 214, which evaluates the received primary programming for audio content and video/graphical content which satisfies predetermined content criteria. Additionally, commentary provider 206 analyzes primary programming for trends associated with the predetermined content criteria. In one embodiment, the trend information is stored locally within commentary generator 206, while in alternate embodiments, the trend information is stored in an externally accessible storage location. It should be understood that alternate embodiments of supplemental program provider 200 may include a filter (or filters) in the front end of supplemental program provider 200 to filter text information from received primary programming, providing only text information to keyword search engine 210, while the remaining programming content (e.g., audio, video/graphical, etc.) is provided to content evaluator 214. One skilled in the art will appreciate that although commentary provider 206 is depicted in the illustrated embodiment as including both keyword search engine 208 and content evaluator 214, alternate embodiments of the present invention may be practiced with only the keyword search engine 208, or the content evaluator 214, without deviating from the spirit and scope of the present invention.

In one embodiment of the present invention, the predetermined content criteria employed by keyword search engine 208 to evaluate the received primary programming is saved in user profiles in supplemental programming database 210. In one embodiment, supplemental programming database 210 includes a list of predetermined content criteria (e.g., keywords, audio or visual) with corresponding supplemental programming associated with each of the predetermined content criteria entries, for each of a plurality of system users. In alternate embodiments, supplemental programming database 210 may well include additional user preference/profile information associated with the preferred system environment for the corresponding system user. In accordance with the illustrated embodiment, the predetermined content criteria may be default settings provided by the manufacturer, or user defined content criteria entered in user profiles of the supplemental programming database 210 by corresponding individual users of supplemental programming provider 200. Jumping ahead to FIG. 3, one example of a supplemental programming database (i.e., supplemental programming database 300) is illustrated.

Figure 3:
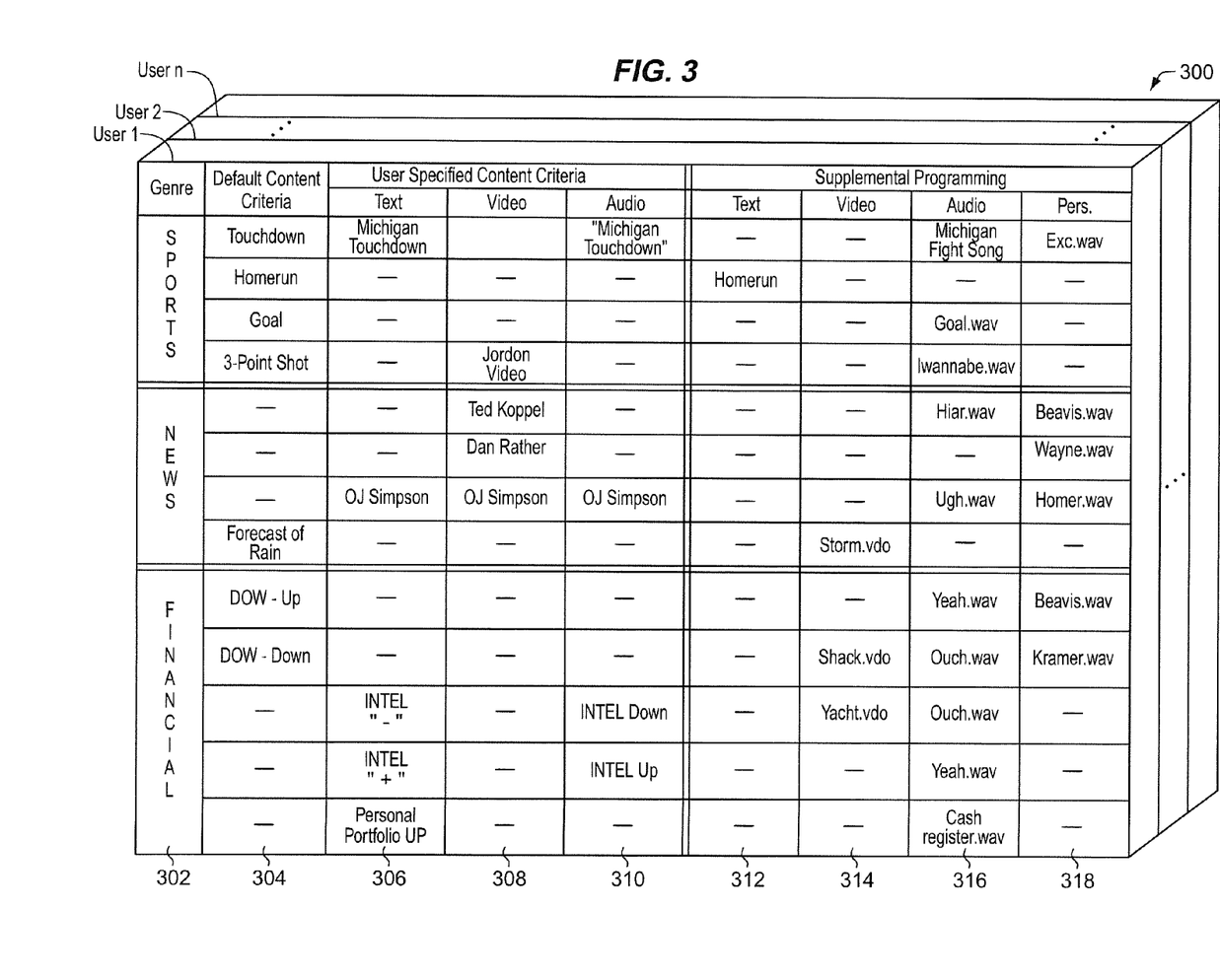
FIG. 3 illustrates an example of a supplemental programming database suitable for use by the supplemental programming provider of FIG. 2, in accordance with one embodiment of the present invention.

As depicted in the illustrated example embodiment of FIG. 3, supplemental programming database 300 including the individual user profiles is a three-dimensional relational database. In the illustrated embodiment, the y-axis is characterized by identifying the genre 302 of the predetermined content criteria and the associated supplemental programming. Those skilled in the art will appreciate that genre information 302 is but one of a number of alternative means by which the information within supplemental programming database 300 may be organized. Thus, a number of suitable alternative approaches exist for organizing the information of supplemental programming database 310, without departing from the spirit or scope of the present invention. The x-axis is characterized by default content criteria 304, and user specified content criteria in the form of text 306, video/graphical 308 and audio 310 content. Corresponding supplemental programming is provided in the form of text 312, video/graphical 314 and audio 316 supplemental programming. Moreover, audio supplemental programming 316 may be generated in a number of alternative "personalities" (e.g., Beavis, John Wayne, excited person, etc.) dictated by the personality index of column 318. In addition, personality index 318 may be relied upon to produce supplemental programming corresponding to the personality of the user.

As depicted in the illustrated example of FIG. 3, the z-axis of supplemental programming database 300 provides multiple "pages" of the x- and y-axes (user profile) corresponding to a plurality of system users of system 100. In an alternate embodiment, supplemental programming database 300 may simply contain a list of keywords with a corresponding list of supplemental programming responses. In yet another embodiment, supplemental programming database may simply include a list of keywords, relying on commentary provider 206 to store and determine which supplemental programming response is appropriate when the predetermined content criteria has been satisfied.

As described within the context of the present invention, supplemental programming is intended to include a wide variety of content and media. In one embodiment, the content of the supplemental programming may be informative (e.g., a definition of a spoken word, or a translation of a foreign language), or entertaining (e.g., a comment on a particular celebrity). In one embodiment, supplemental programming may include audio commentary on the received primary programming, video clips interjected in a pop-up window of, for example, a television or monitor, or text displayed on a television or computer terminal in response to received primary programming. In accordance with the illustrated embodiment, supplemental programming database 210 may be preloaded with a number of predetermined content criteria (e.g., default content criteria) with corresponding supplemental programming. In addition, supplemental programming provider 200 provides a user interface which allows a user of the system to enter personalized content criteria (e.g., user specified content criteria) corresponding to a wide variety of media, and the associated supplemental programming corresponding to the predetermined content criteria. Those skilled in the art will appreciate that although supplemental programming database 300 is depicted as a three-dimensional relational database, this is for ease of explanation only. That is, databases of greater or lessor complexity may be beneficially substituted for supplemental programming database 300, with a corresponding effect on the amount and complexity of the information contained therein.

In addition to evaluating the received primary programming for the predetermined content criteria of supplemental programming database 210, in one embodiment keyword search engine 208 also searches primary programming database 222 for programming description information that satisfies the predetermined content criteria found in supplemental programming database 210. Primary programming database 222 contains program description information on the primary programming available from a wide variety of sources. In one embodiment, for example, primary programming database 222 is a localized version of an on-line programming guide (e.g., an electronic program guide (EPG)), and the program description information is a summation of the programming available from a particular source at a particular time. One example of a primary programming database is illustrated in FIG. 4.

Figure 4:
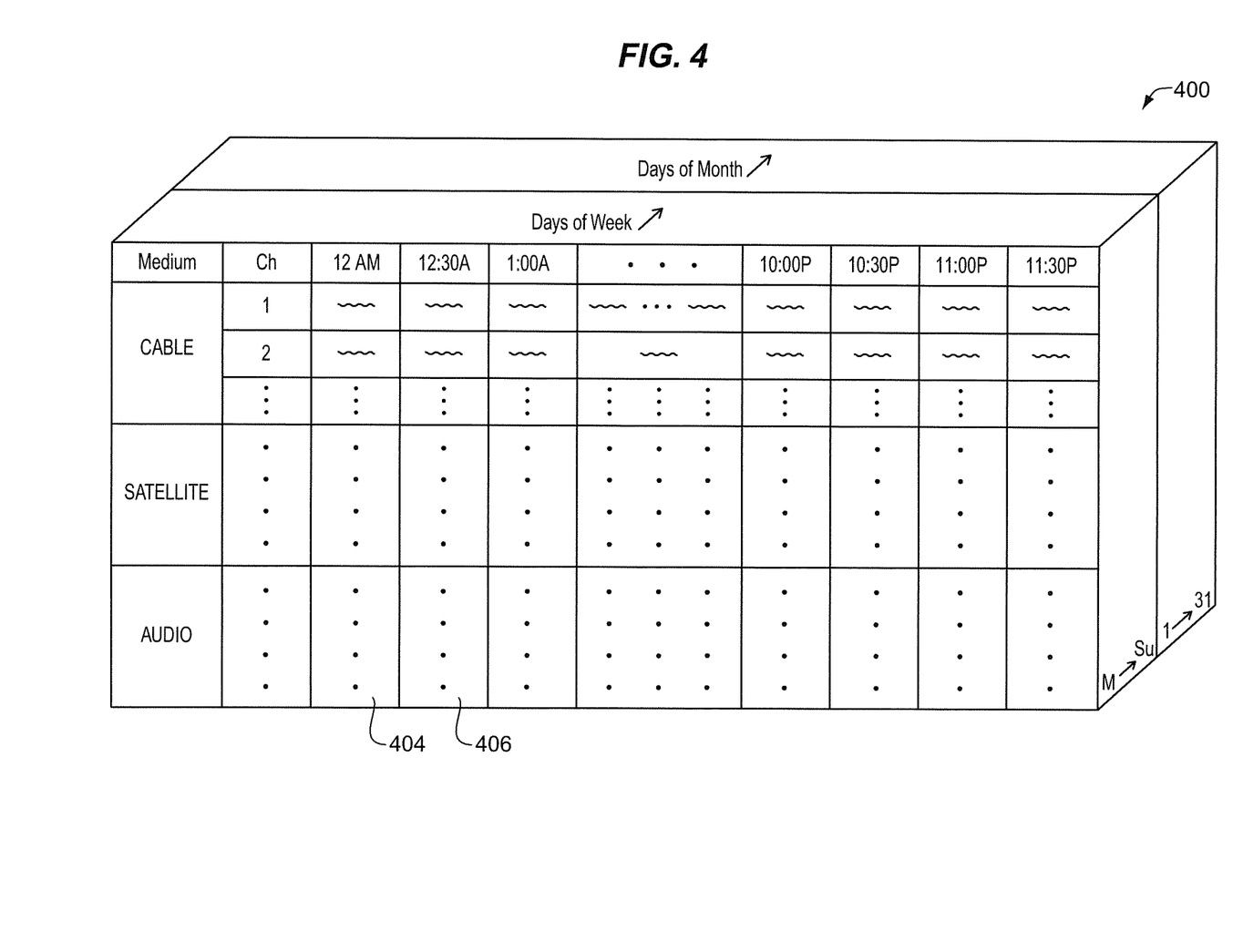
FIG. 4 illustrates an example of a primary programming database suitable for use by the supplemental programming provider of FIG. 2, in accordance with one embodiment of the present invention.

In the illustrated embodiment of FIG. 4, primary programming database 400 is a three-dimensional database, with primary programming referenced by time of day on the x-axis, primary programming source indicated on the y-axis, organized by the day of the week and month in the z-axis. In the illustrated embodiment, primary programming database 400 is updated on a monthly basis, however those skilled in the art will recognize that primary programming database 400 may be updated more frequently. In the illustrated example of FIG. 4, a 24-hour day is divided into half-hour segments 404, 406, etc. In one embodiment, the primary programming information corresponding to the source of the primary programming and the time of day contains primary programming description information in the form of text.

Accordingly, in the context of FIG. 2, keyword search engine 208 searches the primary programming database 222 corresponding to the time/source of the primary programming for text that satisfies the predetermined content criteria of supplemental programming database 210. Although primary programming database 222 is integrated with supplemental programming provider 200 in the example embodiment of FIG. 2, those skilled in the art will appreciate that primary programming database 222 may well be an external source of program description information, accessible by supplemental programming provider 200 as necessary.

Continuing with FIG. 2, supplemental programming provider 200 also includes content evaluator 214 for evaluating the audio components and video/graphical components of the primary programming, an EPG, or stored programming for the predetermined content criteria associated with the user profiles stored in supplemental programming database 210. In particular, content evaluator 214 analyzes audio input and video/graphical input for matches against the audio and/or video/graphical predetermined content criteria (e.g., found in columns 316 and 314, respectively) of supplemental programming database 210. In one embodiment, for example, content evaluator 214 utilizes a speech comparator to evaluate the audio content of the received primary programming for audio content which satisfies the predetermined audio content criteria (e.g., as found in column 316) of supplemental programming database 210. In one embodiment, content evaluator 214 similarly utilizes a video/graphical comparator to evaluate the video/graphical images of the received primary programming for images which satisfy the predetermined video/graphical content criteria (e.g., as found in column 314) of supplemental programming database 210. Devices which analyze audio information and devices which analyze video/graphical information are known to those skilled in the art, thus, further description is not necessary.

With continued reference to the example embodiment of FIG. 2, if the predetermined content criteria is satisfied by the received primary programming, or corresponding description information from primary programming database 222, the appropriate supplemental programming is supplied to commentary generator 216 from the supplemental programming database 210 by keyword search engine 208 or content evaluator 214, respectively. In the illustrated embodiment, commentary generator 216 generates the supplemental programming from the input supplied by either keyword search engine 208 or content evaluator 214. For example, if the supplemental programming corresponding to the predetermined content criteria is comprised of audio information, commentary generator 216 generates an audio signal containing the supplemental programming content, in the personality identified by personality index 318. In an alternate embodiment, keyword search engine 208 or content evaluator 214 supply commentary generator 216 with an index identifying a file which contains the supplemental programming. For example, with reference to FIG. 3, if keyword search engine 208 receives primary programming with the closed caption text reading "Michigan Touchdown", keyword search engine 208 provides commentary generator 216 with the content of the "Michigan Fight Song". Consequently, commentary generator 216 generates audio supplemental programming from the Michigan Fight Song input received from keyword search engine 208. Thus, in one embodiment, supplemental programming provider 200 monitors primary programming, or the primary programming database for information corresponding to the predetermined content criteria, and provides the associated supplemental programming content identified in supplemental programming database 210.

In an alternate embodiment, commentary provider 206 monitors primary programming for information trends, and provides supplemental programming in accordance with the analyzed trend information. For example, if from a user profile it is apparent that a user is interested in the performance of Intel® stock, commentary provider will analyze the trend of the stock performance, providing supplemental programming as appropriate. In one embodiment, the trend information is stored locally within commentary provider 206, and as primary programming is identified satisfying a predetermined content criteria associated with the performance of Intel® stock, the corresponding supplemental programming is provided. In an alternate embodiment, the trend information may be stored remotely and accessed as needed by commentary provider 206. Another example wherein commentary provider 206 analyzes primary programming for trend information is, in accordance with the Michigan football game example above, commentary generator determines in the third quarter that Michigan is down by a touchdown, commentary provider 206 generates audio supplemental programming to the effect of "Let's Go, Michigan", in a corresponding personality.

In yet another embodiment, supplemental programming provider 200 analyzes the predetermined content criteria of a particular user profile to develop a "personality profile" for a user, and automatically generates supplemental programming in accordance with the generated personality profile. That is to say, supplemental programming provider 200 produces supplemental programming based on a "personality profile" identified in the user profile stored in supplemental programming database 210. In one embodiment, for example, a teenager is viewing a television show with a considerable amount of action—explosions, gunfire, etc. Based on the user profile associated with the teenager stored in supplemental programming database 210, supplemental programming provider 200 develops a personality profile for the teenager and identifies an affinity for such action. Consequently, based on the personality profile developed by supplemental programming provider 200, commentary generator 216 generates a three-dimensional animated figure in a corner of the viewable screen of the television which providing the audio commentary "cool, man!", in accordance with the personality index associated with the teenager. Thus, rather than relying on pre-programmed supplemental programming obtained from supplemental programming database 210, supplemental programming provider 200 is able to analyze the personality of the user (based on the user profile) to develop and provide appropriate supplemental programming. In alternate embodiments, the user may influence the personality profile as programming preferences change.

With continued reference to FIG. 2, the supplemental programming generated by commentary generator 216 is supplied to a commentary delivery module (e.g., commentary delivery module 218). In one embodiment, commentary delivery module 218 synchronizes the supplemental programming with the primary programming for delivery to the appropriate system element (e.g., television, audio components, computer system, etc.). In one embodiment, commentary delivery module 218 supplies only the supplemental programming to the appropriate system element (e.g., television, audio component(s), computer system, etc.). In an alternate embodiment, commentary generator 216 supplies supplemental programming to the appropriate system element.

In an alternate embodiment of supplemental programming provider 200, supplemental programming may be generated as a background process and supplied to commentary provider 206, which stores it for subsequent use as dictated by keyword search engine 208 or content evaluator 214. In this alternate embodiment, commentary provider 206 supplies the supplemental programming directly to commentary delivery module 218 without the intervening commentary generator module 216.

Figure 5:
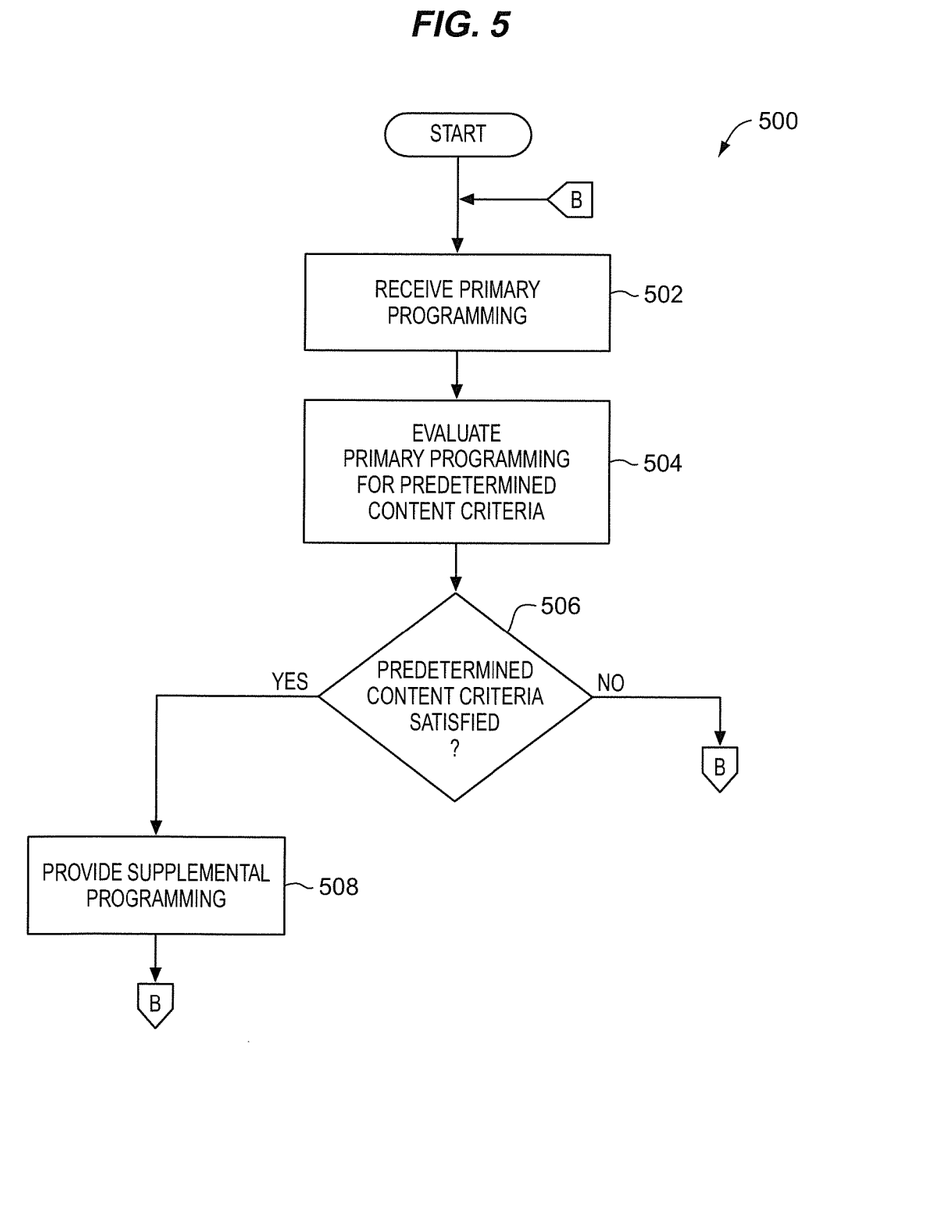
FIG. 5 is a flow chart illustrating the method steps for providing personalized supplemental programming, in accordance with one embodiment of the present invention.
Figure 6:
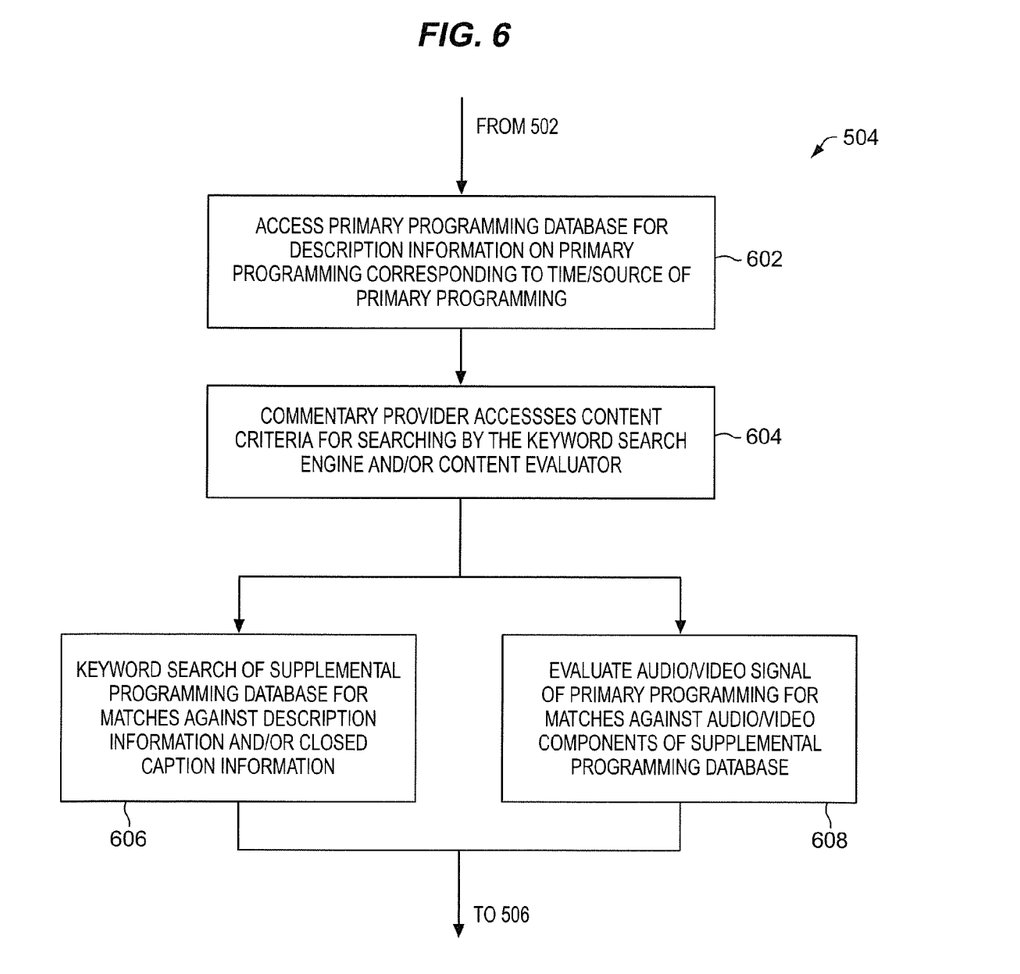
FIG. 6 is a flow chart illustrating the method steps for evaluating primary programming for predetermined content criteria, in accordance with one embodiment of the present invention.

Turning now to FIGS. 5 and 6, flow charts illustrating one embodiment of the method steps for automatically providing personalized supplemental programming are provided. For ease of explanation, and not limitation, the method of FIGS. 5 and 6 will be developed in the context of system 100 incorporating supplemental programming provider 200, supplemental programming database 300 and primary programming database 400. As illustrated, the method starts, step 500, wherein a user (e.g., user_1) begins using system 100, thereby causing system 100 to begin to receive primary programming. Accordingly, supplemental program provider 104 receives the primary programming at commentary provider 206 via line 102, step 502. In step 504, the primary programming is evaluated for predetermined content criteria. Greater detail of such evaluation will be discussed in greater detail below, with reference to FIG. 6. In step 506, supplemental programming provider 104 determines whether the predetermined content criteria has been satisfied. If so, supplemental programming provider 104 provides the appropriate system component(s) with supplemental programming from supplemental programming database 210 that is associated with the predetermined content criteria satisfied, step 508. In an alternate embodiment, upon satisfying the predetermined content criteria, supplemental programming provider 104 issues supplemental programming to the appropriate system component(s) that does not, necessarily, correspond to the primary programming, but is randomly generated. Having provided the supplemental programming in step 508 or, if the predetermined content criteria was not satisfied in step 506, the process loops back to step 502. The method continues until the system is turned off, or the user disables the supplemental program provider.

As alluded to above, FIG. 6 is a flow chart illustrating the method steps for evaluating the primary programming and/or programming description information obtained from primary programming database 222 for predetermined content criteria (i.e., step 504), in accordance with one embodiment of the present invention. In accordance with the illustrated example embodiment, keyword search engine 208 accesses primary programming database 222 for description information corresponding to the time/source of the received primary programming, step 602. In step 604, commentary provider 206 accesses the predetermined content criteria of the supplemental programming database 210 for use by keyword search engine 208 and content evaluator 214. Keyword search engine 208 evaluates the textual information from the received primary programming and/or the description information from primary programming database 222, against the predetermined content criteria available in supplemental programming database 210, step 606. Similarly, content evaluator 214 evaluates the audio content and the video/graphical content of the received primary programming against the predetermined content criteria available in supplemental programming database 210, step 608. In one embodiment, the evaluation of criteria in the selection of content is dependent on the user profile and the content personality. That is, if the primary programming is in accordance with the "personality profile" for a current system user, supplemental programming provider 200 provides supplemental programming associated with the primary programming. In accordance with the illustrated example embodiment, if either keyword search engine 208 or content evaluator 214 identifies primary programming that satisfies the predetermined content criteria, it supplies commentary generator 216 with the appropriate supplemental programming, returning to step 506.

In one embodiment, except for the incorporated teachings of the present invention (described above), supplemental programming provider 104 is intended to represent a broad category of computer systems known in the art. An example of such a computer system is a desktop computer system equipped with a high performance microprocessor(s), such as the Pentium® processor, Pentium® Pro processor, or Pentium® II processor manufactured by and commonly available from Intel Corporation of Santa Clara, Calif.; including any of a number of audio and video input and output peripherals/interfaces for receiving, digitizing, compressing and decompressing audio and video signals. It is to be appreciated that the housing size and design for supplemental programming provider 104 may be altered, allowing it to better visually fit within system 100. Accordingly, supplemental programming provider 104 may well be embodied in a "set-top" box incorporated with the teachings of the present invention.

Figure 7:
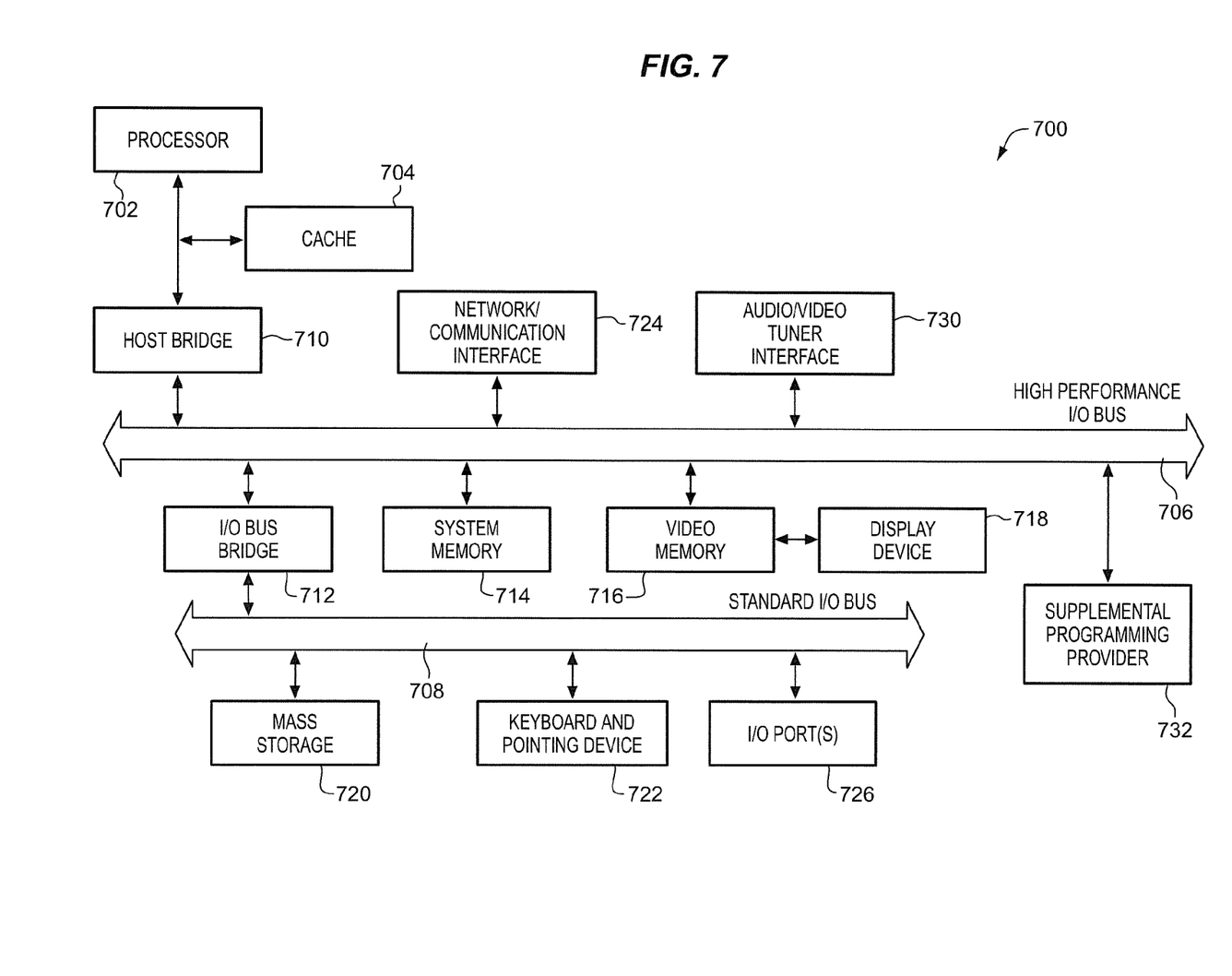
FIG. 7 is a block diagram of a computer system incorporating the teachings of the present invention.

FIG. 7 provides a block diagram of a computer system (e.g., system 700) incorporated with the teachings of the present invention. In one embodiment, system 700 is supplemental programming provider 104 of FIG. 1. In the illustrated embodiment, system 700 includes at least one processor (e.g., processor 702) and cache memory 704 coupled to each other as shown. Additionally, system 700 includes high performance input/output (I/O) bus 706 and standard I/O bus 708, as shown. Host bridge 710 couples processor 702 to high performance I/O bus 706, whereas I/O bus bridge 712 couples high performance I/O bus 706 to standard I/O bus 708. Coupled to high performance I/O bus 706 are network/communication interface 724, system memory 714, audio/video interface board 730, supplemental programming provider 732 and video memory 716. In turn, display device 718 is coupled to video memory 716. Coupled to standard I/O bus 708 are mass storage device 720 keyboard and pointing device 722, and I/O ports 726. In one embodiment, keyboard and pointing device are coupled to standard I/O bus 708 with a serial communication interface cable, while in alternate embodiments it may be communicatively coupled with an infrared (IR) interface or a radio-frequency (RF) interface.

With continued reference to FIG. 7, elements 702-730 perform their conventional functions as known in the art. In particular, network/communication interface 724 is used to provide communication between system 700 and any of a wide range of conventional networks, such as Ethernet, token ring, the Internet, etc. Similarly, audio/video interface board 730 is used to receive broadcast communications from any of a wide range of conventional broadcast media such as RF broadcasts, satellite broadcasts, cable broadcasts, etc. Mass storage device 720 is used to provide permanent storage for the data and programming instructions to implement the above described functions, whereas system memory 714 is used to provide temporary storage for the data and programming instructions when executed by processor 702. I/O ports 726 are one or more serial and/or parallel communication ports used to provide communication between additional peripheral devices which may be coupled to system 700 (e.g., stereo, speakers, etc.). Collectively, the elements coupled to system 700 are intended to represent a broad category of hardware systems, including but not limited to general purpose computer systems based on the Pentium® processor, the Pentium® Pro processor, or the Pentium® II processor commonly available from Intel Corporation of Santa Clara, Calif.

In one embodiment, supplemental programming provider 732 includes the elements of supplemental programming provider 200, including the elements necessary for performing audio analysis and video/graphical analysis of received primary programming and/or program description information obtained from a primary programming database. In an alternate embodiment, supplemental programming provider 732 is comprised of commentary provider 206 and commentary generator module 216, while the supplemental programming database 210 and primary programming database 222 are stored on mass storage 720, or are remotely located and communicatively coupled to supplementary program provider 732 via network/communication interface 724. In one embodiment, supplemental programming provider 732 receives primary programming from network/communication interface 724 and/or audio/video tuner interface 730, evaluates the primary programming, and returns supplemental programming to the appropriate elements in accordance with the teachings above. In an alternate embodiment, supplemental programming provider 732 receives primary programming via an antennae (not shown) coupled to I/O ports 726, supplying supplemental programming to network/communication interface 724 and/or audio/video tuner interface 730. In an alternate embodiment, supplemental programming provider 732 receives primary programming via I/O ports 726 and supplies supplemental programming to network/communication interface 724 and/or audio/video tuner interface 730, in accordance with the teachings above.

It is to be appreciated that various components of system 700 may be re-arranged. For example, cache 704 may be on-chip with processor 702. Alternatively, cache 704 and processor 702 may be packed together as a "processor module", with processor 702 being referred to as the "processor core". Furthermore, mass storage device 720, keyboard and pointing device 722, and/or display device 718 and video memory 716 may not be included in system 700. Additionally, the peripheral devices shown coupled to standard I/O bus 708 may, in alternate embodiments, be coupled to high performance I/O bus 706; in addition, in some implementations only a single bus may exist with the components of system 700 being coupled to the single bus. Furthermore, additional components may be included in system 700, such as additional processors, storage devices, or memories.

In one embodiment, rather than including a separate supplemental programming provider 732, the innovative features of the present invention discussed above may be implemented as a series of software routines run by system 700 of FIG. 7. These software routines run a plurality or series of instructions to be executed by a processor, such as processor 702 in system 700. Initially, the series of instructions are stored on a storage device, such as mass storage device 720. It is to be appreciated that the series of instructions may be stored on any conventional storage device, such as a diskette, CD ROM, magnetic tape, digital versatile disk (DVD) (also referred to as a digital video disk), laser disk, ROM, flash memory, etc. It is also to be appreciated that the series of instructions need not be stored locally, and could be received from a remote storage device, such as a server on a network, via network/communication interface 724. The instructions are copied from the storage device, such as mass storage device 720, into system memory 714 and then accessed and executed by processor 702. In one embodiment, these software routines are written in the C++ programming language. It is to be appreciated, however, that these routines may be implemented in any of a wide variety of programming languages. In alternate embodiments, the present invention may be implemented in discrete hardware or firmware. For example, an application specific integrated circuit (ASIC) could be programmed with the above described functions of the present invention.

Figure 8:
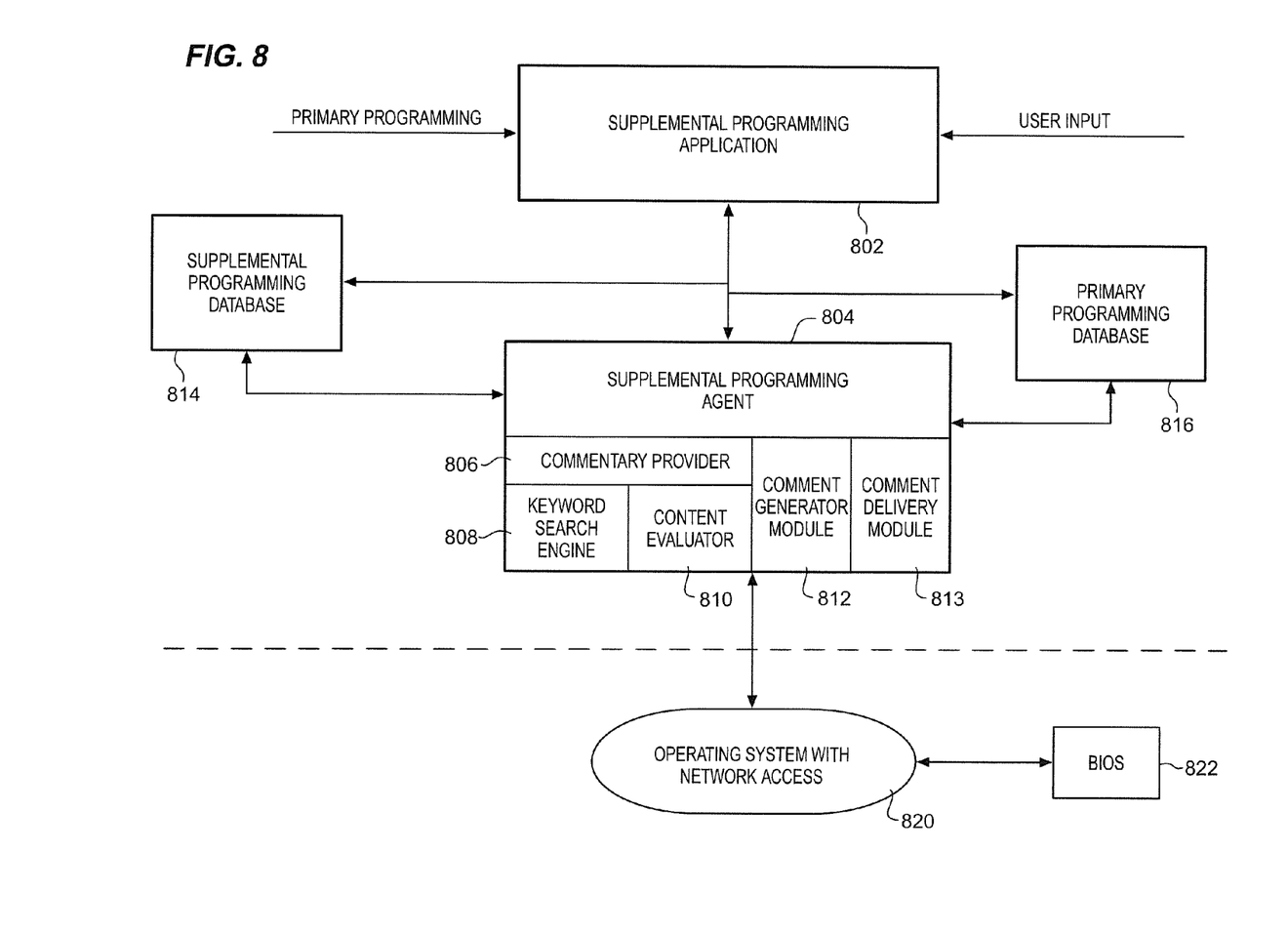
FIG. 8 is a block diagram illustrating the software elements in accordance with one embodiment of the present invention.

FIG. 8 is a block diagram illustrating the software elements according to one embodiment of the present invention. In particular software architecture 800 is shown comprising supplemental programming application 802, supplemental programming agent 804 with associated commentary provider 806 including keyword search engine 808 and content evaluator module 810, commentary generator module 812 and commentary delivery module 814, and an operating system 820 with associated drivers. In particular, supplemental programming application 802 interfaces with supplemental programming agent 804 and provides the user interface for supplemental programming provider 104 of FIG. 1.

In one embodiment, supplemental programming agent 804 is coupled to and able to obtain information from supplemental programming database 814, and primary programming database 816. In an alternate embodiment, supplemental programming database 814 and/or primary programming database 816 are integrated modules of supplemental programming agent 804. In one embodiment, commentary provider 806 performs the steps of evaluating the primary programming, and the program description information obtained from primary programming database 816 against the predetermined content criteria stored in supplemental programming database 814. In the illustrated example embodiment, keyword search engine 808 and content evaluator module 810 of commentary provider 806 perform such evaluation. In one embodiment, upon receiving a trigger from commentary provider 806 that the predetermined content criteria has been satisfied, commentary generator module 812 generates supplemental programming associated with the satisfied predetermined content criteria. In an alternate embodiment, commentary generator module 812 generates supplemental programming as a background process for use by commentary provider 806 when the predetermined content criteria has been satisfied. In either instance, supplemental programming is supplied to commentary delivery module 813 for delivery to supplemental programming application 802 and appropriate system elements via the operating system 820 and basic input/output system (BIOS) 822, which will be discussed in greater detail below. In one embodiment, commentary delivery module 813 receives the supplemental programming as well as the primary programming for delivery to the appropriate system elements.

As alluded to above, BIOS 822 provides an interface between operating system 820 and the various I/O devices coupled to the hardware system. Operating system 820 is a software service which provides an interface between BIOS 822 and supplemental programming agent 804 as well as other software applications, if any, being executed by a computer system within which the present invention is practiced (e.g., system 700). Operating system 820 provides an interface, such as a graphical user interface (GUI), between the user and the system controller. According to one embodiment of the present invention, operating system 820 is the Windows™ 95 operating system, available from Microsoft Corporation of Redmond, Wash. However, it is to be appreciated that the present invention may be used with any other conventional operating system, such as, for example, other versions of Microsoft Windows™ (for example, Windows™ 3.0, Windows™ 3.1, Windows™ NT, or Windows™ CE), Microsoft DOS, OS/2, available from International Business Machines Corporation of Armonk, N.Y., the Apple Macintosh Operating System, available from Apple Computer Incorporated of Cupertino, Calif., the NeXTSTEP® operating system available from Apple Computer Incorporated, or the UNIX operating system, available from Santa Cruz Operations of Santa Cruz, Calif.

Thus, the present invention automatically provides personalized supplemental programming in response to primary programming that satisfies predetermined content criteria. As discussed above, the present invention advantageously monitors and evaluates received primary programming for predetermined content criteria, and automatically supplies personalized supplemental programming when such predetermined content criteria is satisfied.

While the method and apparatus of the present invention has been described in terms of the above illustrated embodiments, those skilled in the art will recognize that the invention is not limited to the embodiments so described. The present invention can be practiced with modification and alteration within the spirit and scope of the appended claims. For example, although depicted as separate components, supplemental program provider 104 may be incorporated into any number of system components (e.g., a television/monitor/video cassette recorder/playback device) within system 100. Further, supplemental program provider 104 may not include all of the elements of FIG. 2 or 5, or may, alternatively, include additional elements. Accordingly, the description is to be regarded as illustrative instead of restrictive on the present invention.

Thus, a method and apparatus for providing supplemental programming has been described.

What is claimed is:

1. A set-top box comprising:
a receiver to receive primary programming;

an electronic program guide, the electronic program guide containing descriptive information regarding programs of the primary programming;

a supplemental programming database having content criteria and associated supplemental programming, the supplemental programming being programming that supplements the primary programming;

a processor agent to evaluate the descriptive information of the electronic program guide for a selected program using the content criteria and to identify the supplemental programming associated with the used content criteria using the database, the content criteria comprising user personalized and user entered content criteria, the supplemental programming being identified in accordance with user programming affinity determination based upon user programming preference analysis of the types of programming that have undergone user access;

a delivery module, coupled to the processing agent, to provide the identified supplemental programming to an element of an entertainment system together with the selected program.

2. The set-top box of claim 1, wherein the descriptive information comprises text.

3. The set-top box of claim 1, wherein the content criteria comprises text and wherein evaluating comprising comparing the content criteria text to the descriptive information text to find a match.

4. The set-top box of claim 1, wherein the content criteria comprises a keyword and wherein evaluating comprises searching the descriptive information text for the keyword.

5. The set-top box of claim 1, wherein the supplemental programming database comprises a list of keywords, each keyword being associated with specific supplemental programming content.

6. The set-top box of claim 1, wherein the supplemental programming database content comprises audio and video files each associated with each keyword and wherein identifying the supplemental content comprises retrieving an associated audio or video file.

7. The set-top box of claim 1, wherein if the content criteria is satisfied, then the processor applies the criteria to the supplemental programming database to identify supplemental programming content and wherein the delivery module combines the retrieved content with the primary programming to generate combined programming; and provides the combined programming to the element of the entertainment system.

8. An apparatus comprising:

a computer system that comprises system memory, the computer system comprising an electronic program guide, the electronic program guide containing descriptive information regarding programs of primary programming;

a supplemental programming database including supplemental programming content associated with search criteria;

a search engine to search the descriptive information based on the criteria, the criteria being satisfied when it is associated with descriptive information that describes primary programming being provided to an element of an entertainment system;

a processor agent, communicatively coupled to the search engine, the processor agent to access the supplemental programming database upon the criteria being satisfied, to retrieve supplemental programming content associated with the criteria from the database, and to combine the retrieved content with the respective primary programming, the supplemental programming content being identified in accordance with user programming affinity determination based upon user programming preference analysis of the types of programming that have undergone user access; and a delivery component, communicatively coupled to the processor agent, the delivery component to provide the combined programming to a tangible element of the entertainment system.

9. The apparatus of claim 8, further comprising a primary programming database to supply the primary programming to the search engine, wherein the primary programming database includes closed captioning text and the search engine searches the primary programming by applying a keyword to the closed captioning text.

10. The apparatus of claim 8, wherein the supplemental programming content comprises video, graphics, text, or audio.

11. The apparatus of claim 8, wherein the supplemental programming database comprises a three-dimensional relational database, the first dimension identifying genre of the content, the second dimension being characterized by user-specified text criteria, and the third dimension corresponding to different users.

12. The apparatus of claim 8, wherein the supplemental programming database comprises a multidimensional database and wherein one dimension of the database comprises a plurality of genres associated with the primary programming.

13. The apparatus of claim 8, wherein the supplemental programming database comprises a multidimensional database and wherein one dimension of the database comprises a plurality of user profiles.

14. The apparatus of claim 8, wherein the processor agent develops a personality profile for different entertainment system users based on search criteria for different users.

15. The apparatus of claim 14, wherein the processor agent generates supplemental programming in accordance with the developed personality profile.

16. The apparatus of claim 15, wherein the processor agent provides the selected supplemental programming in a personality corresponding to the developed personality profile.

17. The apparatus of claim 8, wherein the search criteria and associated supplemental programming is provided by a user of the entertainment system.

18. The apparatus of claim 8, wherein the search criteria and associated supplemental programming is provided by the manufacturer of the entertainment system.

19. A method comprising:

receiving primary programming;

searching descriptive information of an electronic programming guide based on search criteria, the criteria being satisfied when it is associated with descriptive information that describes primary programming being provided to an element of an entertainment system, the descriptive information being information of an electronic program guide and describing programs of the primary programming, the search criteria being of a supplemental programming database including supplemental programming content associated with the search criteria;

accessing the supplemental programming database upon the criteria being satisfied, to retrieve supplemental programming content associated with the criteria from the database, supplemental programming content being identified in accordance with user programming affinity determination based upon user programming preference analysis of the types of programming that have undergone user access;

combining the retrieved content with the respective primary programming program; and providing the combined programming to a tangible element of the entertainment system.

20. The method of claim 19, wherein the supplemental programming database comprises a multidimensional database and wherein one dimension of the database comprises a plurality of user profiles.

21. The method of claim 20, further comprising accessing a user profile, and wherein accessing the supplemental programming further comprises applying the user profile to the supplemental programming database to identify content based on the user profile.

22. Non-transitory machine-readable medium storing instructions that, when executed by a machine, result in the machine performing operations comprising:

receiving primary programming;

searching descriptive information of an electronic programming guide based on search criteria, the criteria being satisfied when it is associated with descriptive information that describes primary programming being provided to an element of an entertainment system, the descriptive information being information of an electronic program guide and describing programs of the primary programming, the search criteria being of a supplemental programming database including supplemental programming content associated with the search criteria;

accessing the supplemental programming database upon the criteria being satisfied, to retrieve supplemental programming content associated with the criteria from the database, supplemental programming content being identified in accordance with user programming affinity determination based upon user programming preference analysis of the types of programming that have undergone user access;

combining the retrieved content with the respective primary programming program; and providing the combined programming to a tangible element of the entertainment system.

23. The medium of claim 22, wherein searching the descriptive information comprises applying a keyword to the electronic programming database.

24. The medium of claim 23, wherein accessing the supplemental programming database comprises applying the keyword to the supplemental programming database, the supplemental programming database comprising a list of the searched keywords and a list of audio and video files associated with each keyword and wherein retrieving content comprises retrieving an associated audio or video file.

* * * * *